US010098497B2

(12) United States Patent
Ceotto et al.

(10) Patent No.: US 10,098,497 B2
(45) Date of Patent: Oct. 16, 2018

(54) DEVICE FOR INTRODUCING A FILTER-HOLDER INTO A COFFEE DISPENSER

(71) Applicant: CMA MACCHINE PER CAFFE' S.r.l., Susegana (Treviso) (IT)

(72) Inventors: Beppino Ceotto, Silea (IT); Giovanni Rossetto, Conegliano (IT)

(73) Assignee: CMA MACCHINE PER CAFFE, S.R.L., Susegana (IT)

(*) Notice: Subject to any disclaimer, the term of this patent is extended or adjusted under 35 U.S.C. 154(b) by 223 days.

(21) Appl. No.: 15/029,679

(22) PCT Filed: Oct. 13, 2014

(86) PCT No.: PCT/EP2014/071846
§ 371 (c)(1),
(2) Date: Apr. 15, 2016

(87) PCT Pub. No.: WO2015/055557
PCT Pub. Date: Apr. 23, 2015

(65) Prior Publication Data
US 2016/0270588 A1    Sep. 22, 2016

(30) Foreign Application Priority Data
Oct. 16, 2013    (IT) .............................. MI2013A1712

(51) Int. Cl.
*A47J 31/44*    (2006.01)
*A47J 31/06*    (2006.01)

(52) U.S. Cl.
CPC ......... *A47J 31/446* (2013.01); *A47J 31/0657* (2013.01); *A47J 31/44* (2013.01); *A47J 31/4467* (2013.01)

(58) Field of Classification Search
CPC .... A47J 31/0657; A47J 31/4467; A47J 31/44; A47J 31/446
(Continued)

(56) References Cited

U.S. PATENT DOCUMENTS 4,787,299 A * 11/1988 Levi .................... A47J 31/0657
99/285
5,463,933 A * 11/1995 Landais .............. A47J 31/0657
99/285
(Continued)

FOREIGN PATENT DOCUMENTS

EP    1034729    9/2000
EP    1688072    8/2006
(Continued)

OTHER PUBLICATIONS

Search Report, Written Opinion; ITMI20131712 dated Oct. 16, 2013.
(Continued)

*Primary Examiner* — Dana Ross
*Assistant Examiner* — Kuangyue Chen

(57) ABSTRACT

The device for introducing a filter-holder into a coffee dispenser, comprising a cup-shaped container inside which is housed a perforated filter for containing the coffee powder and from which a handle projects, said cup-shaped container having two tabs arranged to engage in a connection element connected to the coffee machine, characterized in that said connection element comprises sliding means inside which said tabs of said cup-shaped container engage sliding along a straight path.

11 Claims, 5 Drawing Sheets

(58) Field of Classification Search
USPC .......................................................... 99/289 R
See application file for complete search history.

(56) References Cited

U.S. PATENT DOCUMENTS

| | | | |
|---|---|---|---|
| 7,017,474 B2 * | 3/2006 | Comte ................. | A47J 31/3614 99/287 |
| 2007/0272084 A1 * | 11/2007 | Mandralis ........... | A47J 31/0668 99/275 |
| 2007/0273065 A1 * | 11/2007 | Tokui ...................... | B29C 45/66 264/328.1 |
| 2011/0223302 A1 * | 9/2011 | Star ........................... | A23L 2/39 426/425 |

FOREIGN PATENT DOCUMENTS

| | | |
|---|---|---|
| EP | 2599413 | 6/2013 |
| WO | 2006038227 | 4/2006 |

OTHER PUBLICATIONS

International Search Report, PCT/EP2014/071846, International Filing Date Oct. 13, 2014; dated Oct. 16, 2013. CMA Macchine Per Caffe's R.L.

\* cited by examiner

DEVICE FOR INTRODUCING A FILTER-HOLDER INTO A COFFEE DISPENSER

This application is the US national phase application of international application number PCT/EP2014/071846, filed 13 Oct. 2014, which designates the US and claims priority to Italian Application No. MI2013A001712 filed 16 Oct. 2013, the contents of each of which are hereby incorporated by reference as if set forth in their entireties.

The present invention relates to a device for introducing a filter-holder into a coffee dispenser.

PRIOR ART

As is known, different types of automatic, semi-automatic and manual coffee machines having several dispensers of the coffee beverage into the cup beneath currently exist on the market.

In all these types of machine, the operator must manually fill the perforated filter, arranged in the cup-shaped container, with coffee.

Subsequently, after compressing the coffee powder, the operator must attached the cup-shaped container underneath a connection ring provided on the dispenser.

This latter operation requires a certain skill on the part of the user, since the tabs present on the cup-shaped container must be made to coincide with the special slots provided in the connection ring without said slots being clearly visible.

Subsequently, once the operator has engaged the tabs in the relative slots, said operator must semi-rotate the cup-shaped container in an anticlockwise direction by means of its handle, causing the tabs to rise and thus also the cup-shaped container.

This operation compresses a seal positioned between the connection ring and the cup-shaped container to allow a hydraulic seal when the coffee is dispensed.

DRAWBACKS OF THE PRIOR ART

All the aforesaid operations require a considerable ability of the user during the phase of coupling the cup-shaped container and the connection ring and a considerable force during rotation of the cup-shaped container with respect to the connection ring.

If it is considered that an operator, for example a barman, performs said operations hundreds of times during a normal working day, it is easy to understand the degree of fatigue.

This means that the quality of the coffee produced is not constant over time and deteriorates as the day progresses, since it is highly dependent, as said, on the professional abilities of the operator.

Furthermore, the coffee dispensing cycle time depends, as seen, on said operations and, therefore, the time taken to couple the cup-shaped container and the connection element negatively influences the number of coffees produced daily.

TECHNICAL TASK OF THE INVENTION

The technical task of the present invention is, therefore, to provide a device for introducing a filter-holder into a coffee dispenser which obviates the above-described technical drawbacks.

OBJECTS OF THE INVENTION

Within the scope of this technical task, an object of the invention is that of providing a device for introducing a filter-holder into a coffee dispenser which allows the quality of the coffee produced to be maintained constant over time.

A further object of the invention is providing a device for introducing a filter-holder into a coffee dispenser which allows a higher number of coffee beverages to be produced with the same coffee machine.

It is a further object of the invention to provide a device for introducing a filter-holder into a coffee dispenser which allows simplified coupling between the cup-shaped container and the connection element.

It is still a further object of the invention to provide a device for introducing a filter-holder into a coffee dispenser which allows the operator's arm absolutely not to be tired at the end of the working day.

The technical task, as well as these and other objects, according to the present invention, are achieved by providing a device for introducing a filter-holder into a coffee dispenser, comprising a cup-shaped container inside which is housed a perforated filter for containing the coffee powder and from which a handle projects, said cup-shaped container presenting two tabs arranged to engage in a connection element connected to the coffee machine, characterised in that said connection element comprises sliding means inside which said tabs of said cup-shaped container engage sliding along a straight path.

Other characteristics of the present invention are also defined in the claims which follow.

Further characteristics and advantages of the invention will more fully emerge from the description of a preferred but not exclusive embodiment of the device for introducing a filter-holder into a coffee dispenser according to the invention, illustrated by way of non-limiting example in the accompanying drawings, in which.

Figure 1:
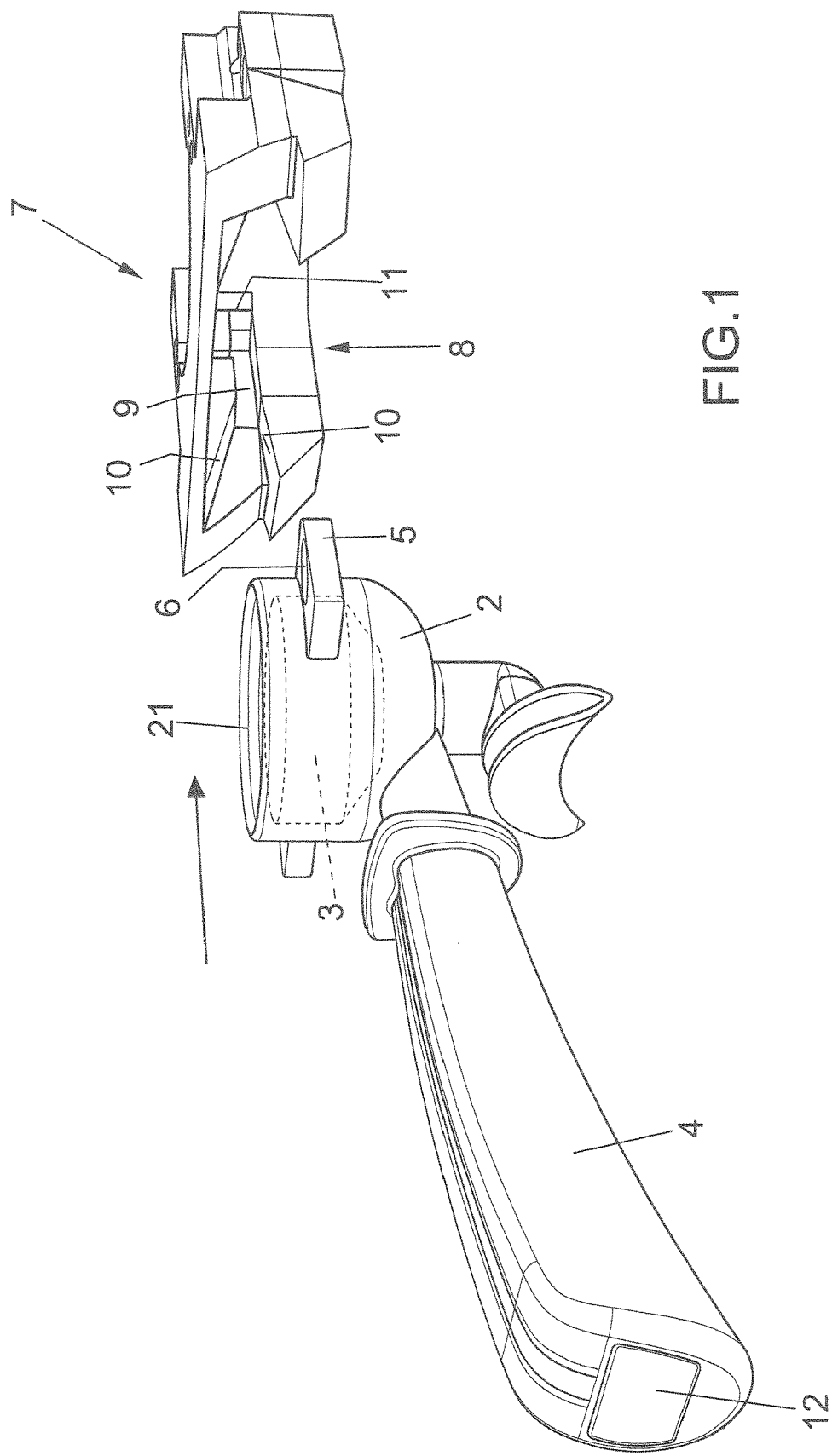
FIG. 1 is a perspective view of the cup-shaped container before being inserted into the connection element according to the invention.
Figure 2:
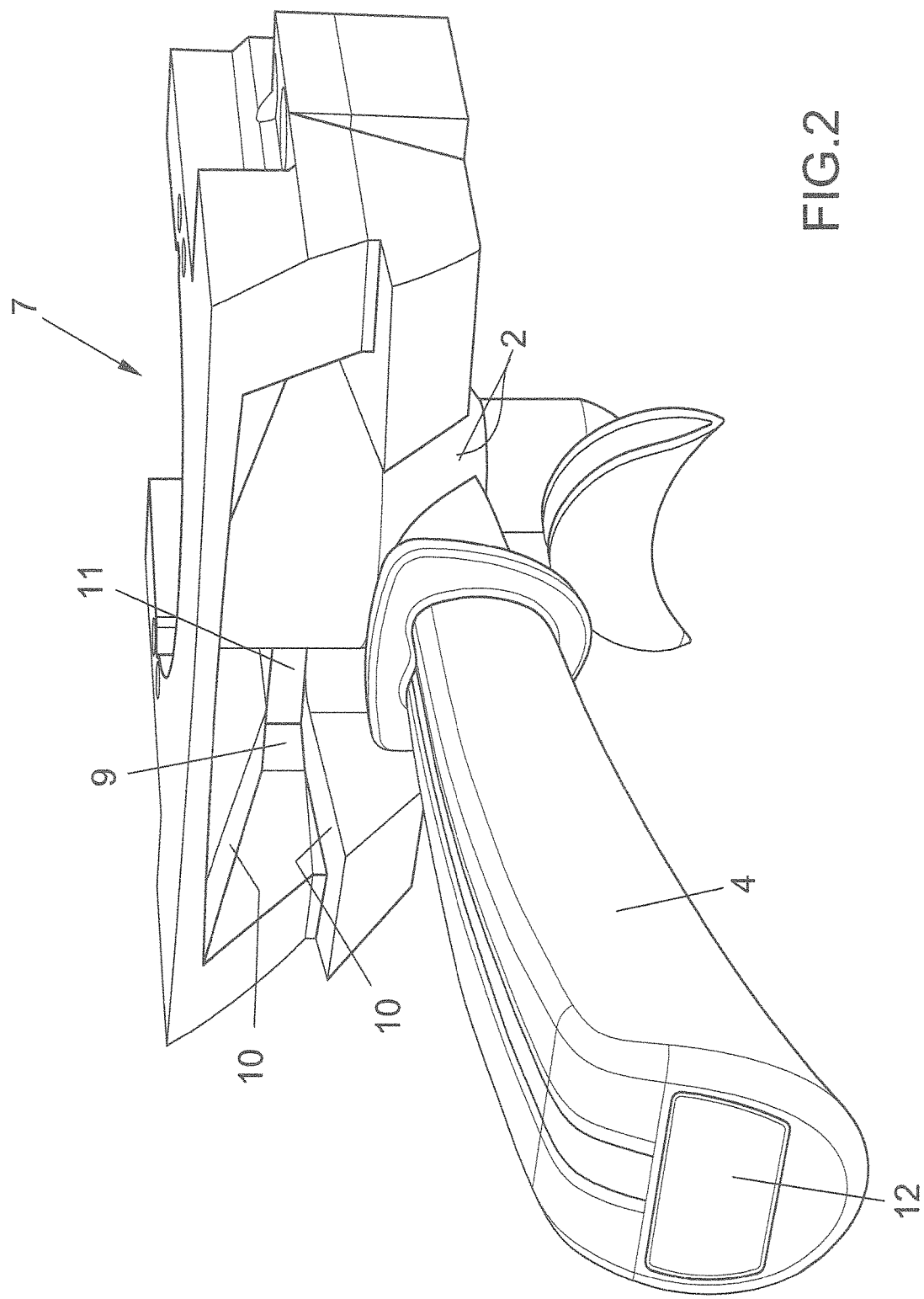
FIG. 2 is a perspective view of the cup-shaped container inserted into the connection element according to the invention.
Figure 3:
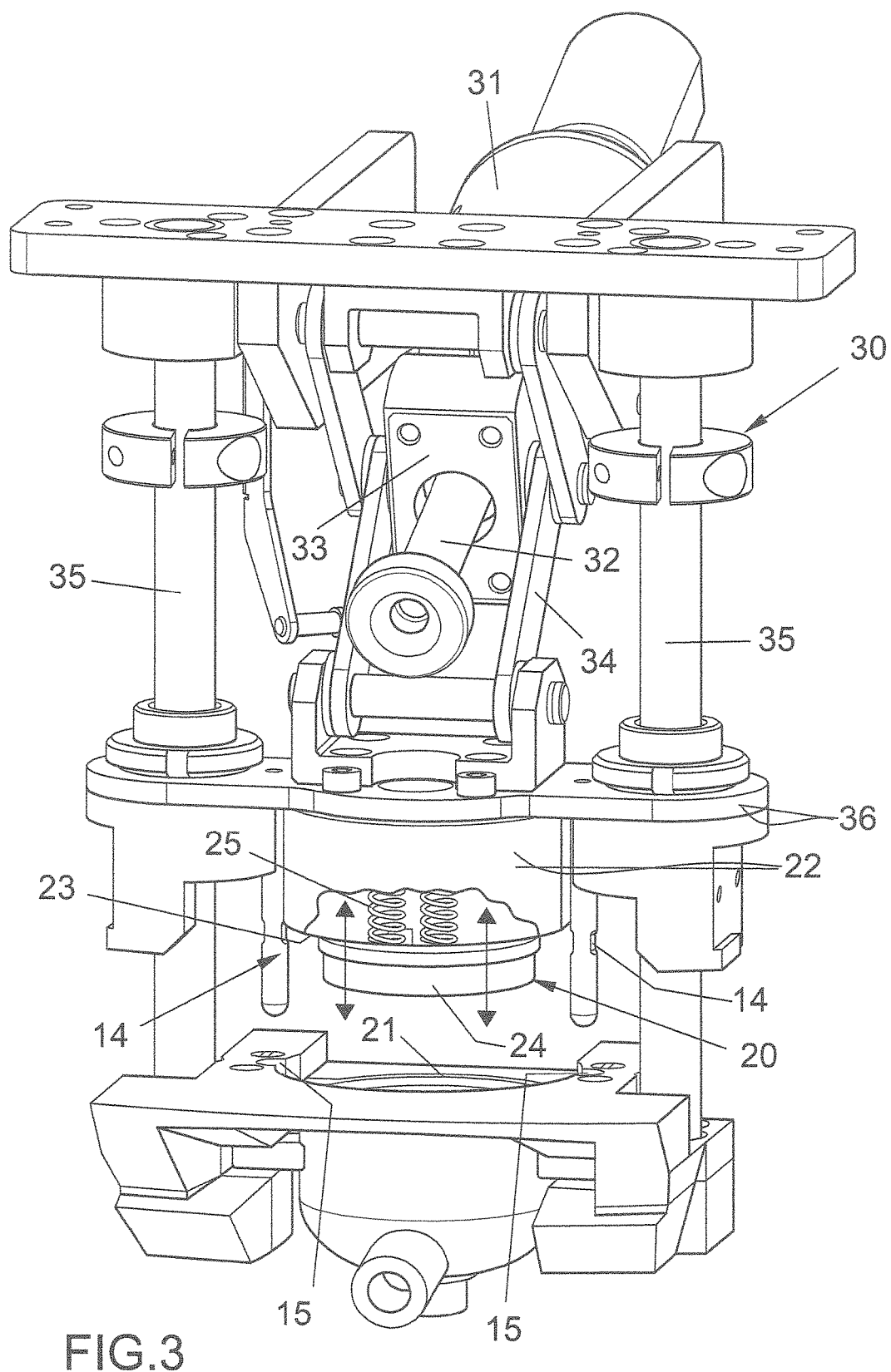
FIG. 3 is a perspective view of the toggle mechanism adapted to move along two guides a mobile plate with which the piston according to the invention is associated.
Figure 4:
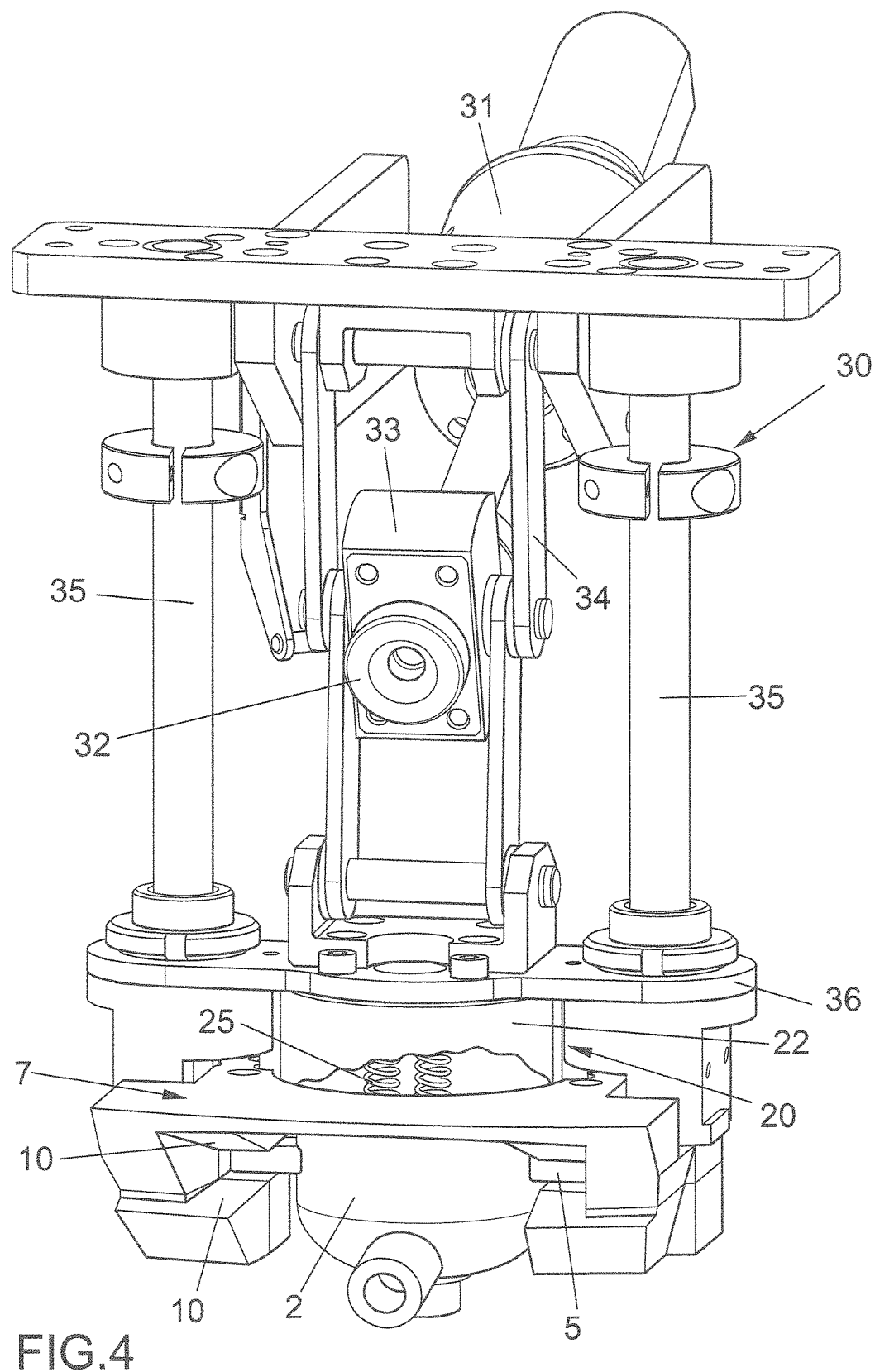
FIG. 4 is a perspective view of the toggle mechanism when the piston is associated with the cup-shaped container according to the invention.
Figure 5:
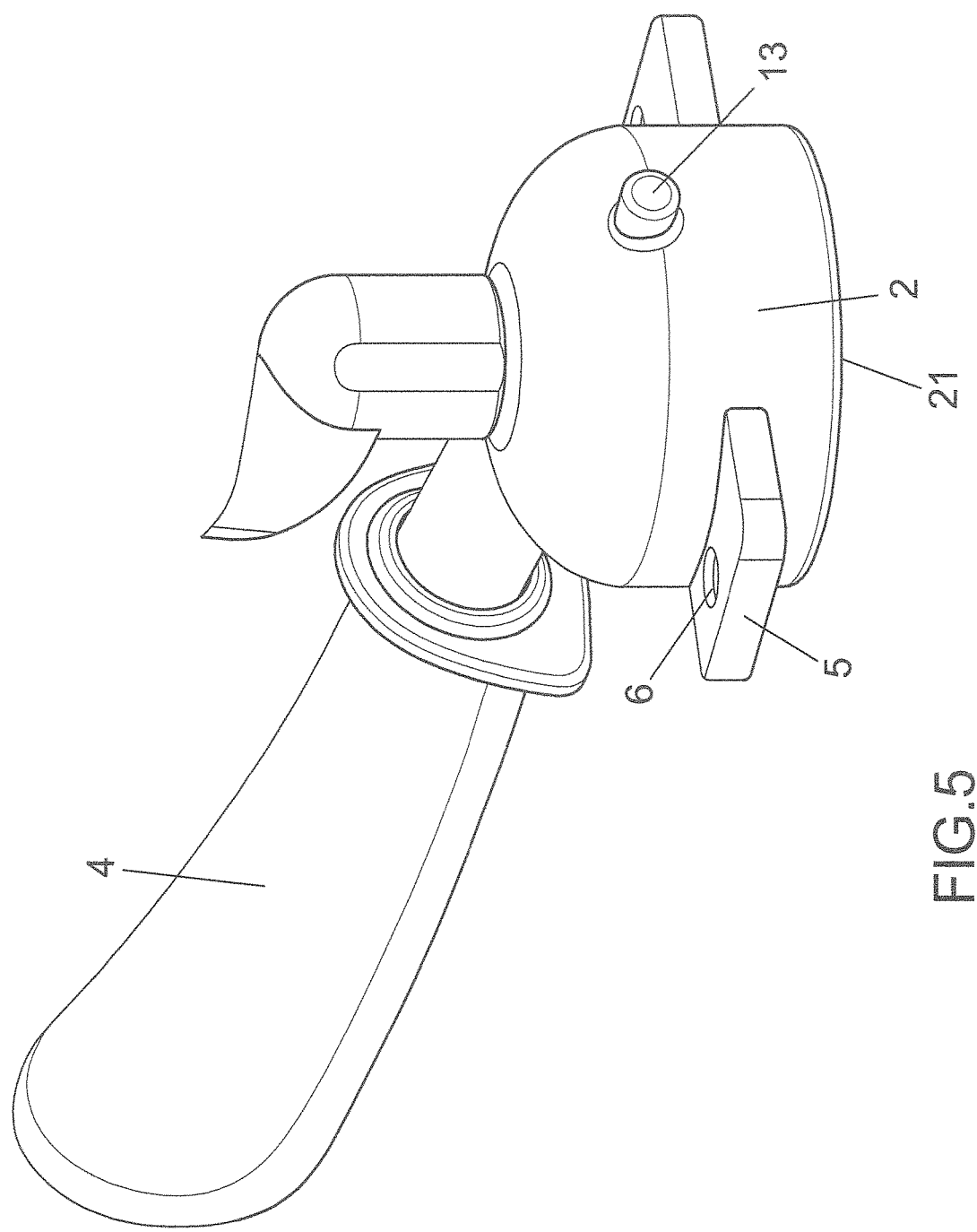

FIG. 5 shows the overhang present on the cup-shaped container to activate its detection means, With reference to the figures mentioned, the device for introducing a filter-holder into a coffee dispenser, indicated comprehensively with the number 1, comprises a cup-shaped container 2 inside which is housed a perforated filter 3 for containing the coffee powder.

A handle 4 extends from the cup-shaped container 2 for handling it.

The end of the handle is provided with a window 12 which has indications on the type of coffee machine or on the correct positioning of the cup-shaped container in the machine or the number of coffees which have been produced during a working day or in a given time period.

For example, correct positioning may also be indicated with a change in colour from red to green.

The cup-shaped container 2 has two diametrically opposing tabs 5 having a hole 6 in their central zone.

The tabs 5 are adapted to engage in a connection element, generically indicated with 7, connected to the coffee machine.

In particular, the connection element 7 comprises sliding means, indicated comprehensively with 8, inside which the tabs 5 of the cup-shaped container 2 engage sliding along a straight path.

The sliding means 8 comprise two opposing and coplanar guides arranged parallel to each other.

Each of the two guides 9 has an inlet zone defined by at least one inclined surface and, in particular, by two inclined surfaces, lower and upper 10, to define a simplified introduction of the tabs 5 into the guides 9.

Furthermore, the guides have an end of travel zone defined by a wall 11 orthogonal to the guides 9 for arrest of the tabs 5 and correct positioning of the cup-shaped container 2 with the connection element 7.

Opportunely, the connection element 7 has detection means of the presence of the cup-shaped container 2 when it is associated with it.

In particular, the cup-shaped container 2 has an overhang 13 on its front zone opposite the handle 4, overhang 13 serving as the detection means for detecting the presence of cup-shaped container 2.

The overhang 13 penetrates into a respective hole, not shown, on the connection element, in a manner to activate, for example, a micro switch of consent to functioning of the coffee machine.

In the case of a cup-shaped container for one dose of coffee, one overhang 13 is present, in the case of two doses of coffee, two overhangs 13 are present.

The connection element 7 also has correct positioning means of the cup-shaped container 2 with respect to the guides 9.

The positioning means comprise two mobile rods 14 in synchronisation with the piston 20.

During descent of the piston 20 the two rods 14 engage in respective housings 15 present on the connection element 7.

During descent of the piston 20 the rods 14, after engaging in the housings 15, also engage in the holes 6 present on the tabs 5 of the cup-shaped container 2.

In this manner an appropriate retaining of the latter in the correct position with respect to the piston 20 is obtained.

The connection element 7 has above said guides an opening 21 of a shape substantially conjugated to said cup-shaped container 2.

The opening 21 has a diameter of suitable dimensions to allow passage of a piston 20 which, after translation and sealed engagement with the cup-shaped container, supplies water inside it.

In particular, the piston 20 has an O-ring 22 having an annular housing 23 in which a seal is arranged, not shown, to obtain a hydraulic seal with the edge of the cup-shaped container 2 and a spray head 24 which is advantageously mobile, in contrast and in the action of elastic means defined by calibrated springs 25, with respect to the O-ring 22 and therefore to the annular housing 23 to compress the coffee inside said perforated filter 3 in a pre-set way.

The device according to the invention also comprises control means, generically indicated with 30, of the piston 20.

The control means 30 comprise a motor 31 which acts on a worm screw 32 which, by means of a nut screw 33, controls a toggle mechanism 34 adapted to move a mobile plate 36 with which said piston is associated along two guides 35.

Operation of the device for introducing a filter-holder into a coffee dispenser according to the invention appears clear from the description and illustration.

In particular, the operator inserts with a straight movement the cup-shaped container 2, full of coffee powder, inside the guides 9 present on the connection element 2.

The overhang 13 allows the machine to translate the piston 20 towards the cup-shaped container 2.

During descent of the piston 20, the rods 14 engage in sequence with the connection element 7 and with the tabs 5, blocking and positioning the cup-shaped container correctly with respect to the piston 20.

Simultaneously, the O-ring 22 engages sealed with the edge of the cup-shaped container 2 and the spray head 24, in contrast and in the action of the springs 25, compresses the coffee powder in a pre-set way.

Subsequently, by means of the spray head 24, hot water is supplied into the perforated filter 3 to make the coffee beverage.

In practice it has been noted how the device for introducing a filter-holder into a coffee dispenser according to the invention is particularly advantageous in not tiring the operator during a working day and guaranteeing a constant quality of the coffee made during said working day.

The device for introducing a filter-holder into a coffee dispenser as conceived herein is susceptible to numerous modifications and variants, all falling within the scope of the inventive concept; furthermore, all the details are replaceable by technically-equivalent elements.

The materials used, as well as the dimensions, may in practice be of any type according to requirements and the state of the art.

The invention claimed is:

1. A device for introducing a filter-holder into a coffee dispenser, comprising a connection element connected to the coffee dispenser, and a cup-shaped container inside which is housed a perforated filter for containing coffee powder and from which a handle projects, said cup-shaped container presenting two tabs arranged to engage in said connection element, wherein said connection element comprises a slide member inside which said tabs of said cup-shaped container engage sliding along a straight path, and said connection element includes an opening of a shape substantially conjugated to said cup-shaped container, and having a diameter of suitable dimensions to allow passage of a piston having a diameter substantially similar to a diameter of said cup-shaped container and adapted for supplying water inside said cup-shaped container.

2. The device according to claim 1, wherein said slide member comprises two opposing coplanar and parallel guides, each presenting an inlet zone and an end of travel zone of said tabs.

3. The device according to claim 2, wherein said inlet zone presents at least an inclined surface for defining introduction of said tabs into said coplanar and parallel guides and said end of travel zone comprises a wall orthogonal to said coplanar and parallel guides for arresting said tabs and positioning of said cup-shaped container in said connection element.

4. The device according to claim 1, wherein said connection element includes first means for detecting presence of said cup-shaped container in said connection element.

5. The device according to claim 1, further comprising a positioning member for positioning said cup-shaped container with respect to said connection element.

6. The device according to claim 5, wherein said positioning member comprises two mobile rods in synchronization with said piston and arranged to engage in respective housings present on said connection element and holes present on said tabs of said cup-shaped container to hold said cup-shaped container in position with respect to said piston.

7. The device according to claim 1, wherein, said cup-shaped container presents on a front zone opposite said handle at least one overhang arranged to activate a detection device.

8. The device according to claim 1, wherein said coffee dispenser includes said piston and said piston includes an O-ring having an annular housing in which is arranged a seal to create a hydraulic seal with an edge of said cup-shaped container, and a spray head movable with respect to said annular housing to compress said coffee powder inside said perforated filter in a pre-set manner.

9. The device according to claim 8, wherein said spray head is movable and adapted to contact said O-ring.

10. The device according to claim 8, further comprising a motor for controlling said piston, said motor adapted to act on a worm screw which, by means of a nut screw, controls a toggle mechanism arranged to move a mobile plate with which said piston is associated, along two further guides.

11. A device for introducing a filter-holder into a coffee dispenser that includes a piston, said device comprising a connection element connected to the coffee dispenser and a cup-shaped container inside which is housed a perforated filter for containing coffee powder and from which a handle projects, said cup-shaped container presenting two tabs arranged to engage said connection element, wherein said connection element includes a slide member inside which said tabs of said cup-shaped container engage sliding along a straight path, and said element includes an opening of a shape substantially conjugated to said cup-shaped container and having a diameter of suitable dimensions to allow passage of said piston having a diameter substantially similar to a diameter of said cup-shaped container, to compress said coffee powder inside said perforated filter and supply water inside said cup-shaped container.

* * * * *